(12) United States Patent
Matsuoka (10) Patent No.: US 7,108,928 B2
(45) Date of Patent: Sep. 19, 2006

(54) WARM-UP OF FUEL CELL POWER PLANT

(75) Inventor: Naoya Matsuoka, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 608 days.

(21) Appl. No.: 10/398,022

(22) PCT Filed: Nov. 12, 2002

(86) PCT No.: PCT/JP02/11767

§ 371 (c)(1),
(2), (4) Date: Apr. 1, 2003

(87) PCT Pub. No.: WO03/061045

PCT Pub. Date: Jul. 24, 2003

(65) Prior Publication Data

US 2004/0013915 A1    Jan. 22, 2004

(30) Foreign Application Priority Data

Dec. 27, 2001  (JP) ............................ 2001-396579
Dec. 27, 2001  (JP) ............................ 2001-396587

(51) Int. Cl.
*H01M 8/04* (2006.01)

(52) U.S. Cl. ........................ 429/13; 429/21; 429/24; 429/26

(58) Field of Classification Search .................. None
See application file for complete search history.

(56) References Cited

U.S. PATENT DOCUMENTS

| 5,798,186 | A | 8/1998 | Fletcher et al. | |
| 6,329,089 | B1 * | 12/2001 | Roberts et al. | ........ 429/13 |
| 2002/0058165 | A1 * | 5/2002 | Gebhardt et al. | ........ 429/13 |

FOREIGN PATENT DOCUMENTS

| EP | 1 113 516 | 7/2001 |
| JP | 2000-315514 | 11/2000 |

* cited by examiner

*Primary Examiner*—Jonathan Crepeau
(74) *Attorney, Agent, or Firm*—McDermott Will & Emery LLP (57) ABSTRACT

A fuel cell (1) comprises an anode (9A) and cathode (9B) disposed on either side of a solid polymer electrolyte membrane (8A), and power is generated by supplying hydrogen to the anode (9A) and supplying hydrogen to the cathode (9B). When the temperature of the fuel cell (1) is below 0° C., water in the cell freezes. When a power plant using the fuel cell (1) is warmed up under the temperature less than 0° C., the anode (9A) is connected to the positive electrode of a secondary battery (13) and the cathode (9B) is connected to the negative electrode of the secondary battery (13) to electrolyze frozen water in the cell, thereby thawing the frozen water using the heat accompanying the electrolysis.

6 Claims, 8 Drawing Sheets

WARM-UP OF FUEL CELL POWER PLANT

FIELD OF THE INVENTION

This invention relates to warm up of a fuel cell power plant below freezing point.

BACKGROUND OF THE INVENTION

In a polymer electrolyte fuel cell (PEFC), hydrogen ions (H+) pass through a solid polymer electrolyte membrane, so the electrolyte membrane must constantly be kept in a wet state. A fuel cell power plant using a fuel cell of this type operates while supplying water to the electrolyte membrane. Therefore, the fuel cell contains a considerable amount of water, and if the power plant is left below freezing in the stationary state, the water in the fuel cell including the water in the electrolyte membrane will freeze. Consequently, in order to start the fuel cell power plant below freezing point, the ice in the fuel cell must first be thawed.

In this regard, Tokkai 2000-315514 published by the Japanese Patent Office in 2000 discloses an apparatus wherein high temperature gas from outside is supplied to a gas passage in the fuel cell to thaw the ice in the cell.

SUMMARY OF THE INVENTION

The high temperature gas supplied from the thawing apparatus is delivered from a pipe outside the fuel cell into a passage formed in a separator of the fuel cell, and reaches a membrane electrode assembly (MEA) comprising an electrolyte membrane, and electrodes which contain catalyst. However, a considerable amount of heat is lost in the pipe or passage in the separator before reaching the MEA. This means that the heating efficiency of this apparatus for heating the MEA is poor. In particular, in a very low temperature environment of −20 degrees centigrade (° C.) or below, a long time is required until the ice in the MEA is completely thawed, and until the power plant can generate power.

It is therefore an object of this invention to shorten the time required to thaw the ice in an MEA below freezing point.

In order to achieve the above object, this invention provides a method of thawing frozen water in a fuel cell, applied to the start-up of a fuel cell power plant comprising a fuel cell stack comprising plural laminated fuel cells each of which has an anode and cathode on either side of an electrolyte membrane. The method comprises detecting a temperature of a fuel cell, and thawing the frozen water when the temperature is less than a freezing point, by a heat generated by applying a direct current voltage between the anode and cathode to cause the frozen water to undergo electrolysis.

The details as well as other features and advantages of this invention are set forth in the remainder of the specification and are shown in the accompanying drawings.

DESCRIPTION OF THE PREFERRED EMBODIMENTS

Figure 1:
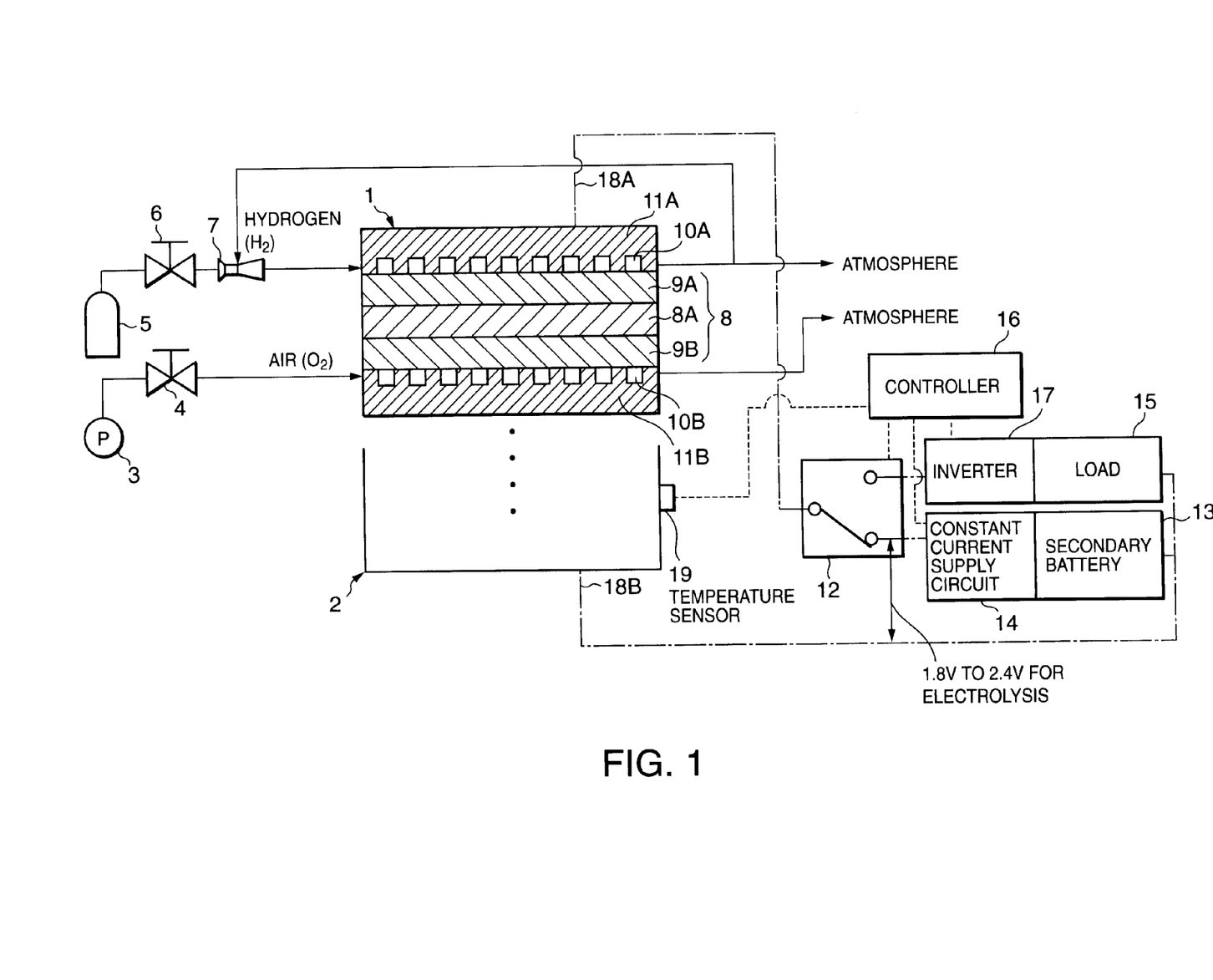
FIG. 1 is a schematic diagram of a fuel cell power plant applying the thawing method of this invention.

Referring to FIG. 1 of the drawings, a fuel cell power plant comprises a fuel cell stack 2 comprising a laminate of a polymer electrolyte fuel cell 1.

The fuel cell 1 comprises a membrane electrode assembly (MEA) 8 and separators 11A, 11B.

The membrane electrode assembly 8 comprises a solid polymer electrolyte membrane 8A, and an anode 9A and cathode 9B in pressure contact on each side of the membrane 8A.

The electrolyte membrane 8A comprises a perfluorosulfonic acid ion-exchange membrane such as Nafion 112 manufactured by Dupont Inc.

Figure 2:
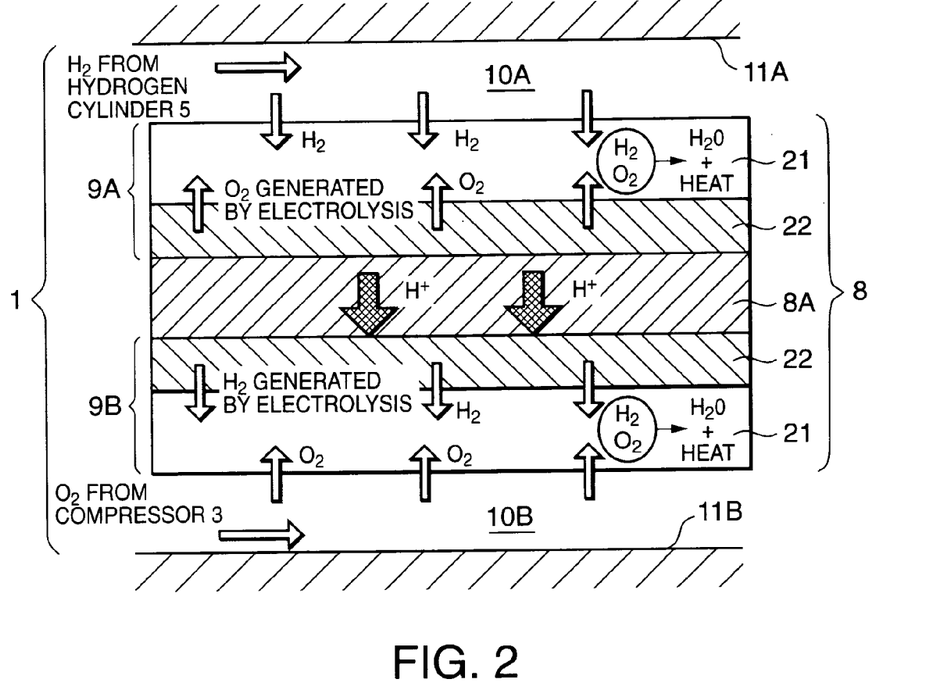
FIG. 2 is a diagram analyzing the production of heat due to chemical reaction in a fuel cell according to the thawing method of this invention.

Referring to FIG. 2, the anode 9A and cathode 9B comprise a gas diffusion layer (GDL) 21 formed of carbon paper, and a three-phase boundary layer 22. The three-phase boundary layer 22 comprises the mixture of a platinum catalyst on carbon black, and the same perfluorosulfonic acid material used in the electrolyte membrane 8A. The mixture is coated on GDL 21. The three-phase boundary 22 has a three phase boundary between a gas comprising hydrogen or oxygen, an electrolyte, and the catalyst.

Referring again to FIG. 1, the separator 11A and separator 11B are comprised of an electrically-conducting material. In the separator 11A, a passage 10A for hydrogen-rich gas is formed adjacent to the anode 9A. In the separator 11B, a passage 10B for oxygen is formed adjacent to the cathode 9B.

Hydrogen-rich gas is supplied to the passage 10A from a hydrogen cylinder 5 via a pressure regulating valve 6. Oxygen is supplied as air to the passage 10B from a compressor 3 via a pressure regulating valve 4.

Hydrogen which has undergone an electrochemical reaction in the anode 9A becomes hydrogen ions, passes through the electrolyte membrane 8A, and combines with oxygen in the cathode 9B to form water vapor.

The water vapor is mainly emitted to the atmosphere as exhaust gas from the cathode 9B. Part of the water vapor diffused to the anode 9A via the electrolyte membrane 8A, and is emitted to the atmosphere from the anode 9A.

As a large amount of hydrogen is supplied to the anode 9A, the exhaust gas from the anode 9A contains a considerable amount of hydrogen in addition to the water vapor. Therefore, an ejector 7 recycles this exhaust gas into the flow of hydrogen from the pressure regulating valve 6 to the passage 10 as anode effluent, and thus makes use of hydrogen efficiently.

The laminated fuel cells 1 are electrically connected in series between electrodes 18A, 18B of the stack 2. The anode 9A is electrically connected to the cathode 9B of the adjacent fuel cell 1 via the separator 11A, and the separator 11B of the adjacent fuel cell 1. The electrode 18A is connected to a switch 12.

The switch 12 is connected to a motor 15 as a load via an inverter 17, and to a secondary battery 13 via a constant current supply circuit 14, respectively, and connects the motor 15 and secondary battery 13 selectively to the electrode 18A according to the switching position. The electrode 18B is connected to an earth wire of the motor 15 and the negative electrode of the secondary battery 13.

The switch 12, inverter 17 and constant current supply circuit 14 are respectively controlled according to signals output from a controller 16. The controller 16 comprises a microcomputer comprising a central processing unit (CPU), read-only memory (ROM), random access memory (RAM) and input/output interface (I/O interface). The controller may also comprise plural microcomputers.

To perform the above control, a temperature signal is input to the controller 16 from a temperature sensor 19 which detects the temperature of the fuel cell stack 2.

In FIG. 1, the solid lines show the gas flow, the dash-and-dot lines show the electricity flow, and the broken lines show the signal flow.

When the power plant starts, if the temperature detected by the temperature sensor 19 is below freezing point, the controller 16 controls the switch 12 to connect the positive electrode of the secondary battery 13 to the electrode 18A of the fuel cell stack 2. As a result, in the fuel cells 1, a direct current flows from the anode 9A to the cathode 9B.

Herein, if the power generating surface area of the electrolyte membrane 8A of the fuel cell 1 is 25cm$^2$, and a current of 1 ampere per square centimeter (A/cm$^2$) is to be passed to the electrolyte membrane 8A, a current of 25A must be passed to the fuel cell stack 2. The constant current supply circuit 14 increases or decreases the voltage of the secondary battery 13 so that the required current flows.

Referring again to FIG. 2, when the MEA 8 is frozen, and a positive voltage is applied to the anode 9A and a negative voltage is applied to the cathode 9B, oxygen is produced at the anode 9A and hydrogen is produced at the cathode 9B due to electrolysis of the frozen water in the MEA 8.

When a voltage above a certain level is applied to the frozen fuel cell 1, electrolysis of water takes place according to the following equation (1):

$$H_2O \rightarrow \frac{1}{2}O_2 + 2H^+ + 2e^- \quad (1)$$
$$2H^+ + 2e^- \rightarrow H_2$$

In this state, hydrogen is supplied to the anode 9A from the hydrogen cylinder 5, air is supplied to the cathode 9B from the compressor 3, and at the anode 9A, the oxygen produced and hydrogen supplied combine to form water. Also at the cathode 9B, the hydrogen produced and oxygen in the supplied air combine to form water. The combination of hydrogen and oxygen is accompanied by the release of heat. Therefore, the ice in the fuel cell stack 2 can be thawed using this heat.

The case will now be considered when the power plant is under temperature conditions of −30° C. Under these temperature conditions, the ion conducting efficiency of the electrolyte membrane 8A is approximately 4 millisiemens per centimeter (mS/cm), so the voltage drop due to the electrolyte membrane is approximately 0.7 volts (V) at 1 A/cm$^2$ of current density. The catalyst activation voltage is approximately 0.3V, and the sum of the voltage drop due to the contact resistance between the GDL 21 and separator 11A, and the voltage drop due to the contact resistance between the GDL 21 and separator 11B, is approximately 0.2V.

The voltage required for electrolysis of water is approximately 1.2V which can be calculated using the Nernst equation on the equilibrium potential required to balance an ion concentration difference across a membrane, shown by the following equation (2).

$$E_r = E_{O2} - E_{H2} = E_0 + \frac{2.3 \cdot R \cdot T}{2 \cdot F} \cdot \log \frac{\sqrt{p_{o2}} \cdot p_{H2}}{p_{H2O}} \quad (2)$$

where,
$E_r$=equilibrium potential,
$E_{O2}$=anode potential,
$E_{H2}$=cathode potential,
$E_0$=standard potential=+1.2V under atmospheric pressure,
R=gas constant,
T=temperature, and
$P_{O2}$, $P_{H2}$, $P_{H2O}$=partial pressures.

If the total loss of 1.2V due to voltage drop is added to this 1.2V, a voltage of approximately 2.4V must be applied between the electrodes in order to perform electrolysis of water in the fuel cell 1 at −30° C. Of this, 1.2V corresponding to an overpotential excluding the part used for electrolysis is converted to heat, and can be used for thawing ice. When a current of 1A/cm$^2$ is passed to the fuel cell 1, this corresponds to a heat release of 1.2 watts per square centimeter (W/cm$^2$). By using this released heat to thaw ice, the ice in the fuel cell stack 2 can be thawed in a short time even in a very cold environment of −30° C.

As described above, the hydrogen produced by electrolysis of water combines with oxygen in the air supplied from the compressor 3, and the oxygen produced by electrolysis of water combines with hydrogen supplied from the hydrogen cylinder 5, which respectively generate heat of reaction. This generated heat further promotes the thawing of ice in the fuel cell stack 2. However, immediately after applying a voltage, the GDL 21 is frozen, so a combination reaction hardly occurs between this hydrogen and oxygen, and the generation amount of reaction heat due to combination between hydrogen and oxygen also increases as thawing proceeds.

Next, the heat produced by applying a voltage between the electrodes of the fuel cell 1 will be described in further detail.

The Joule heat produced in the electrolyte membrane 8A, GDL21 and separators 11A, 11B may be expressed as i$^2$·R. Herein, i is the current density, and R is the electrical resistance of the electrolyte membrane 8A, GDL21 and separators 11A, 11B.

At the contact surface between the GDL 21 and separators 11A, 11B, the surface area, heat is generated according to these contact resistances. In the vicinity of the catalyst of the GDL 21, most of the energy corresponding to the overpotential required to promote the chemical reaction of equation (1) is converted to heat. All this heat is useful in thawing ice.

Further, due to combination between the oxygen produced at the anode 9A by electrolysis of water and the hydrogen supplied from the hydrogen cylinder 5, and combination between the hydrogen produced at the cathode 9B by electrolysis of water and oxygen supplied as air from the compressor 3, heat of reaction is generated as described earlier.

Figure 3A:
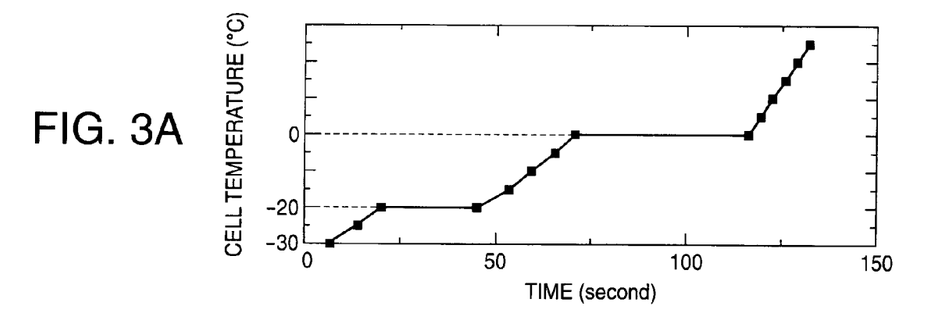
FIGS. 3A and 3B, are timing charts showing an applied voltage and temperature variation of the fuel cell according to the thawing method of this invention.
Figure 3B:
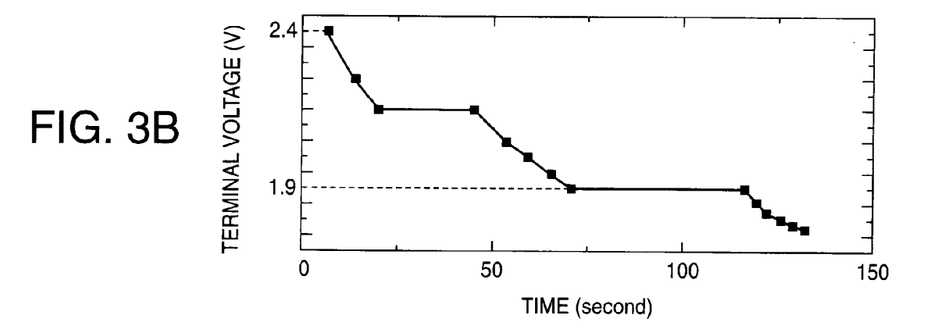

Referring to FIGS. 3A, 3B, the results of thawing experiments performed on the fuel cell 1 by the Inventor will now be described.

When a voltage is applied between the electrodes of the fuel cell 1 frozen at −30° C., the temperature of the fuel cell 1 first increases due to the Joule heat produced in the fuel cell 1 due to application of the voltage. This temperature rise temporarily stops at −20° C. The interruption of the temperature rise shows that water which is partially bound in the electrolyte membrane 8A, is thawing.

Herein, the water in the electrolyte membrane 8A will be described. In the electrolyte membrane 8A, water which is bound to sulfonic acid groups and which is not frozen, free water not bound to sulfonic acid groups and frozen at approximately 0° C. and partially bound water frozen at −20° C., are present. The weight concentration of the mixed water which is the sum of the above, is approximately ten times the weight concentration of the sulfonic acid groups.

Figure 4:
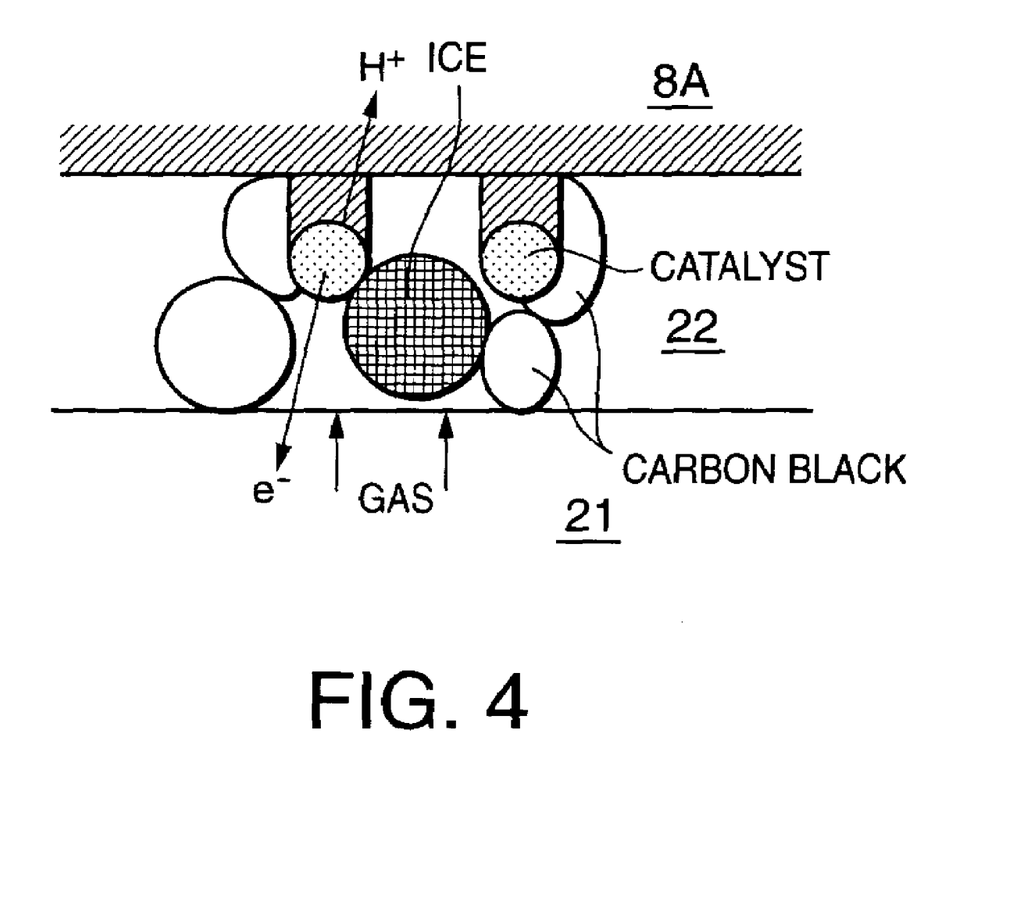
FIG. 4 is a schematic cross-sectional view of a three-phase boundary layer of the fuel cell in the frozen state.

FIG. 4 shows the state inside the three-phase boundary layer 22 at −30° C. In the three-phase boundary layer 22, an electrochemical reaction occurs at the three phase boundary of electrolyte made of perfluorosulfonic acid, Pt catalyst and oxygen gas or hydrogen gas. However, at −30° C., water inside the three-phase boundary layer 22 freezes, and blocks penetration of gas into the catalyst from the GDL 21. In the Figure, only part of the three-phase boundary layer 22 is shown as blocked, but in practice effectively the whole surface is blocked. In this state, the fuel cell 1 cannot generate power, and the oxygen and hydrogen produced at the catalyst by electrolysis, cannot mix with the hydrogen and oxygen supplied from the GDL 21.

Referring again to FIGS. 3A, 3B, the reason why the temperature rise of the fuel cell 1 temporarily stops at −20° C., is that the partially bound water in the electrolyte membrane 8A consumes heat for thawing.

The thawing of the partially bound water is complete at approximately 50 seconds from when the voltage starts to be applied, and the temperature of the fuel cell 1 again rises. When it reaches 0° C., the temperature rise again temporarily stops due to the thawing of frozen free water. When the thawing of free water is complete, the oxygen produced by electrolysis can combine with hydrogen supplied to the passage 10A from the hydrogen cylinder 5, and the hydrogen produced by electrolysis can combine with oxygen supplied to the passage 10B from the compressor 3. The heat of the reaction accompanying the combination of this hydrogen and oxygen, accelerates the temperature rise of the fuel cell 1. In FIG. 3A, the sharp slope of the temperature rise of the fuel cell 1 after all the free water has thawed, is due to this heat of the reaction.

On the other hand, as the temperature of the fuel cell 1 rises, the voltage applied between the anode 9A and cathode 9B decreases. As described above, when the voltage starts to be applied, it is 2.4V, but when the temperature is +20° C., the electrical conductivity of the electrolyte membrane 8A is 30 mS/cm. As a result, the voltage drop due to the electrolyte membrane 8A is approximately 0.1V, and the applied voltage between the electrodes is 1.8V, which is sufficient. If a current of 1A/cm$^2$ is passed through the fuel cell 1 in this state, the emitted heat amount corresponds to approximately 0.6W/cm$^2$.

In this experiment, it was found that about 2 minutes after the voltage starts to be applied, thawing of ice in the fuel cell 1 was complete, and the fuel cell 1 could generate power. The time required to thaw the fuel cell 1 can be further shortened by heating or humidifying the hydrogen supplied to the passage 10A and the air supplied to the passage 10B.

The aforesaid embodiment relates to a fuel cell power plant comprising a single fuel cell stack. In a power plant comprising plural fuel cell stacks, the ice in one of the fuel cell stacks is first thawed by the above method, and the other fuel cell stacks are then thawed using the output current of the fuel cell stack which is now able to generate power due to thawing. If this is done, the load on the secondary battery 13 can be mitigated.

Next, a second embodiment of this invention will be described.

This embodiment concerns the method of applying a voltage to the electrodes 18A, 18B of the fuel cell stack 2. The construction of the hardware is identical to that of the first embodiment, but the positive electrode and negative. electrode of the secondary battery 13 are reversed. Specifically, the negative electrode of the secondary battery 13 is connected to the electrode 18A, and the positive electrode of the secondary battery 13 is connected to the electrode 18B.

Even if hydrogen or oxygen is supplied to the fuel cell 1 at −30° C., the water in the MEA 8 is frozen, so hydrogen or oxygen from the GDL 21 cannot reach the catalyst in the three-phase boundary layer 22, and electrochemical reactions in the layer do not occur.

If a voltage is applied to the electrodes 18A, 18B in the above state as described above, hydrogen is produced at the anode 9A and oxygen is produced in the cathode 9B. 60 seconds after the voltage starts to be applied, thawing of the partially bound water in the electrolyte membrane 8A is complete, as shown in FIG. 3A. At this stage, the switch 12 is operated to change-over the fuel cell stack 2 to the load. Hydrogen is then supplied from the passage 10A to the anode 9A and oxygen is supplied from the passage 10B to the cathode 9B.

At this point, thawing of the partially bound water in the electrolyte membrane 8A is complete, so part of the hydrogen or oxygen reaches the catalyst in the three-phase boundary layer 22, and hydrogen or oxygen produced by electrolysis remains at anode or cathode. As a result, electrochemical reactions at the three-phase boundary can take place and power generation begins. The power generation takes place according to equation (3), which is the reverse of equation (1).

$$\frac{1}{2}O_2 + 2H^+ + 2e^- \rightarrow H_2O \qquad (3)$$

$$H_2 \rightarrow 2H^+ + 2e^-$$

In this power-generating process, heat is produced due to the voltage drop caused by membrane resistance to movement of hydrogen ions in the electrolyte membrane 8A, the voltage drop caused by contact resistance between the GDL 21 and separators 11A, 11B, and the voltage drop due to catalyst activation resistance, respectively. The motor 15 is connected to the fuel cell stack 2, and the hydrogen supply amount and an inverter 17 are controlled to produce power so that the resistance of the motor 15 is 25 milliohms (mΩ) and the current density of the fuel cell stack 2 is 1A/cm$^2$. However, if the current density is 1A/cm$^2$ and the potential difference between the electrodes of the fuel cell 1 is less than 0.4V, adjustment is made in so that it is 0.4V to prevent damage to the fuel cell 1. The heat released. due to the overpotential at this time is within the range of 0.6–1.2W/cm$^2$ depending on the temperature of the fuel cell 1.

Figure 5A:
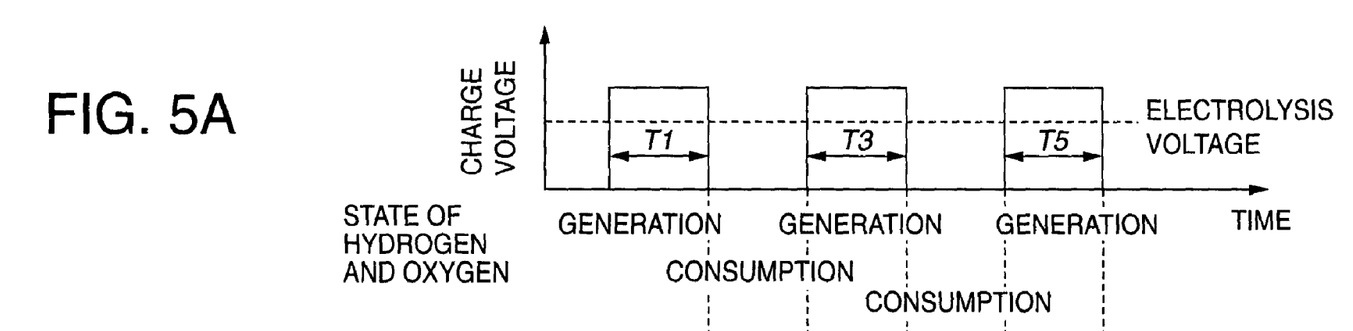
FIGS. 5A and 5B are timing charts describing a voltage application pattern in a thawing method according to a second embodiment of this invention.
Figure 5B:
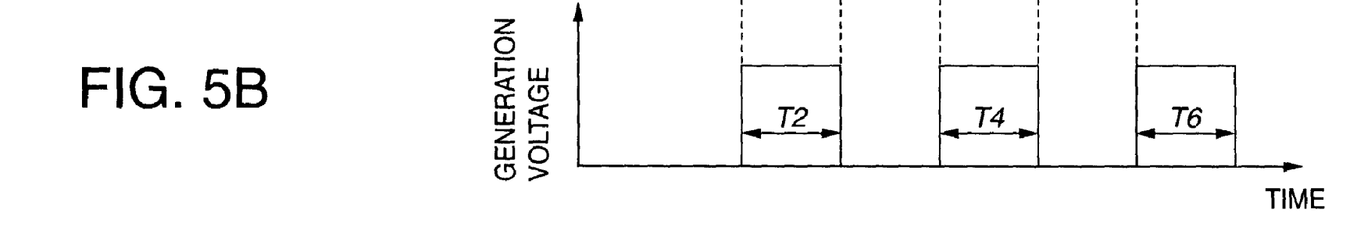

In this embodiment, the voltage-applying process and power-generating process are repeatedly performed as shown in FIGS. 5A and 5B, below 0° C. As a result, as in the first embodiment, the power consumed due to applying the voltage can be reduced compared to the case where the voltage is simply applied continuously, and the warm-up efficiency of the fuel cell stack can be increased.

In FIGS. 5A and 5B, voltage-applying time periods T1, T3, T5 and power-generating time periods T2, T4, T6 are all set to be equal. This setting can also be varied according to the thawing conditions. For example, if the voltage-applying time period is set to be longer than the power-generating time period the hydrogen and oxygen required for power generation can be mainly obtained from electrolysis of water.

Alternatively, the frequency of change-over between the voltage-applying process and power-generating process can be increased according to the elapsed time. In other words, it is also preferable to set T1>T3>T5, T2>T4>T6.

Figure 6A:
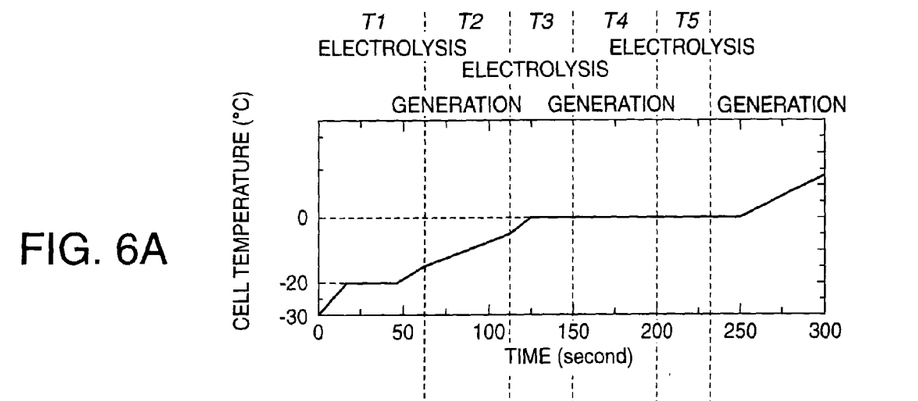
FIGS. 6A–6C are timing charts describing variations of fuel cell temperature, applied voltage and power consumption amount according to the thawing method of the second embodiment of this invention.
Figure 6B:
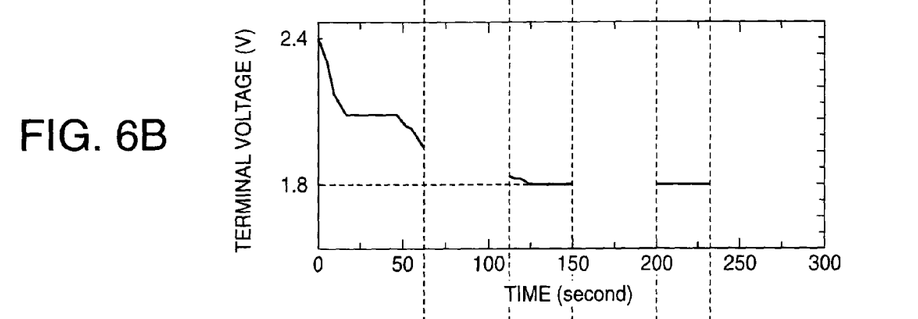
Figure 6C:
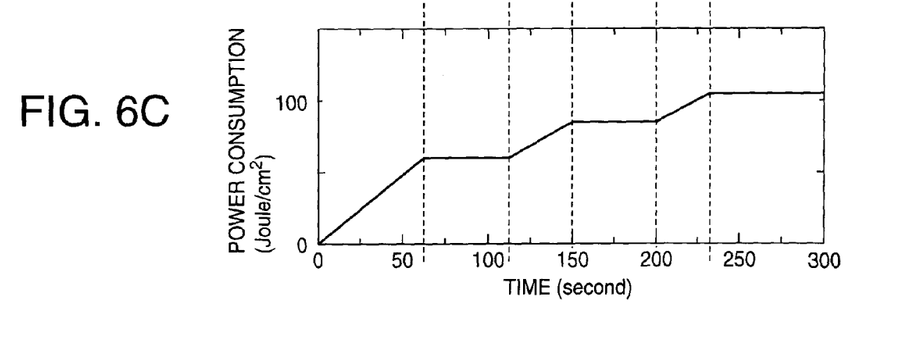

Referring to FIGS. 6A–6C, the Inventor carried out an experiment wherein the voltage-applying process and power-generating process were alternated with T1=60 seconds, T2=50 seconds, T3=40 seconds, T4=50 seconds, T5=30 seconds, and the system then changed over to ordinary power generation.

At –30° C., when the voltage is applied for 60 seconds between the anode and cathode of the fuel cell 1, Joule heat is produced in the cell, and the temperature of the cell rises. At –20° C., the temperature rise temporarily stops due to thawing of the partially bound water in the electrolyte membrane 8A as described above.

Thawing of the partially bound water terminates approximately 50 seconds after the voltage starts to be applied, and the temperature of the fuel cell 1 then rises again. After a voltage has been applied for 60 seconds, the system changes over to the power-generating process. In the power-generating process, hydrogen is supplied from the hydrogen cylinder 5 to the passage 10A, and air is supplied from the compressor 3 to the passage 10B. Inside the fuel cell 1, power is generated using this hydrogen and the oxygen contained in the air, and the temperature of the fuel cell 1 rises due to the heat accompanying power generation. Also, oxygen generated at the anode 18A in the voltage-applying process combines with hydrogen in the passage 10A, and hydrogen generated at the cathode 18B combines with oxygen in the passage 10B. The heat due to these combinations promotes temperature rise of the fuel cell 1. The electrical energy generated in the power-generating process is all consumed as heat. In this power-generating process, the power of the secondary battery 13 is of course not consumed.

After the power-generating process has continued for 50 seconds, they voltage-applying process is again performed for 40 seconds. Approximately 15 seconds after the change-over, the temperature of the fuel cell 1 reaches 0° C. At 0° C., the heat produced by is used as latent heat of liquefaction to thaw the free water, and the temperature rise of the fuel cell 1 temporarily stops. Subsequently, after the voltage-applying process has terminated, the power-generating process lasting for 50 seconds and the voltage-applying process lasting for 30 seconds are performed alternately.

In this way, the free water in the MEA 8 is all thawed after 250 seconds has elapsed from when the thawing operation was begun at –30° C.

The power consumed during the thawing operation is generated only during the voltage-applying process and not during the power-generating process, as shown in FIG. 6C. Also, the applied voltage starts from 2.4V, decreases together with temperature rise of the fuel cell 1, and falls to 1.8V at 0° C.

According to this experiment, the thawing of the fuel cell 1 was completed in approximately 250 seconds after the voltage starts to be applied. The power consumption amount from when the voltage starts to be applied to completion of thawing was 100 Joules /cm$^2$.

Next, referring to FIGS. 7, 8 and FIGS. 9A–9C, a third embodiment of this invention will be described.

Figure 7:
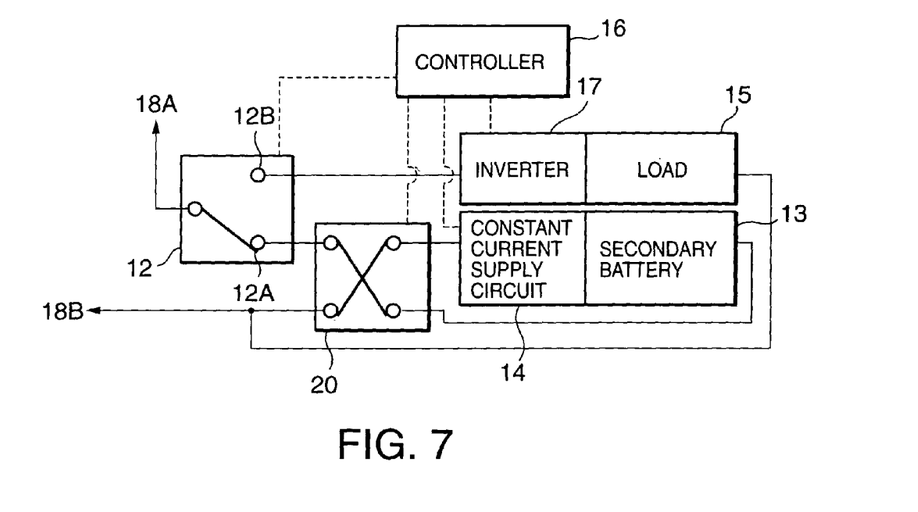
FIG. 7 is an electrical and a signal circuit diagram of a fuel cell power plant applying a thawing method according to a third embodiment of this invention.

First, referring to FIGS. 7, a power plant according to this embodiment comprises another switch 20 between the switch 12 of the first embodiment and the constant current supply circuit 14. The switch 12 connects the electrode 18A of the fuel cell stack 2 selectively to one of a contact 12A leading to the constant current supply circuit 14, and a contact 12B leading to the inverter 17. The switch 20 connects one of the positive electrode of the secondary battery 13 via the constant current supply circuit 14 and the negative electrode of the secondary battery 13 to the contact 12A, and the other to the electrode 18B of the fuel cell stack 2. The change-over of the switches 12, 20 is controlled by the controller 16. The remaining features of the hardware of the power plant are identical to those of the first embodiment shown in FIG. 1.

According to this embodiment, when the contact 12A of the switch 12 is connected to the electrode 18A, the controller 16 operates the switch 20 change-over between a state wherein the positive electrode of the secondary battery 13 is connected to the electrode 18A via the constant current supply circuit 14 and the negative electrode of the secondary battery 13 is connected to the electrode 18B, and a state wherein the negative electrode of the secondary battery 13 is connected to the electrode 18A and the positive electrode of the secondary battery 13 is connected to the electrode 18B via the constant current supply circuit 14.

When the power plant starts up, if the temperature detected by the temperature sensor 19 is below freezing point, the controller 16 operates the switch 12 to connect the contact 12A to the electrode 18A, and operates the switch 20 to connect the negative electrode of the secondary battery 13 to the electrode 18A, and connect the positive electrode of the secondary battery 13 to the electrode 18B via the constant current supply circuit 14. As a result, frozen water in the MEA 8 of the fuel cell 1 is electrolyzed, hydrogen is produced at the anode 9A and oxygen is produced at the cathode 9B of each of the fuel cells 1. In the following description, this process is referred to as a hydrogen/oxygen generating process. In this process, the controller 16 controls the constant current supply circuit 14 so that the current density in the electrolyte membrane 8A is 1A/cm$^2$, as in the first embodiment.

As described above, the ion conductivity of the electrolyte membrane 8A is 4 mS/cm$^2$ at –30° C., and 30 mS/cm$^2$ at –20° C. The voltage drop in the electrolyte membrane 8A when voltage is applied is 0.7V at –30° C., and 0.1V at –20°

C. As the catalyst activation voltage is approximately 0.3V, the voltage drop in the GDL 21 and separator 11A is approximately 0.2V, and the voltage required for electrolysis of water is 1.2V, it is necessary to apply a voltage within the range from 2.4V to 1.8V according to the temperature in order to perform electrolysis of water in the fuel cell 1. Of this voltage, an overpotential of 0.6–1.2V is used for generating heat. As the current density is 1A/cm$^2$, the power consumption amount is 0.6–1.2W/cm$^2$.

Next, the controller 16 changes over the switch 20 so that the positive electrode of the secondary battery 13 is connected to the electrode 18A via the constant current supply circuit 14 and the negative electrode of the secondary battery 13 is connected to the electrode 18B. As a result, oxygen is produced at the anode 9A and hydrogen is produced at the cathode 9B of the fuel cell 1, as in the first embodiment. In the following description, this process is referred to as an oxygen/hydrogen generating process. In this process also, the controller 16 controls the constant current supply circuit 14 in the same way as in the hydrogen/oxygen generation process.

The oxygen produced at the anode 9A in the oxygen/hydrogen generation process combines with hydrogen produced at the anode 9A in the hydrogen/oxygen generating process to form water. The hydrogen produced at the cathode 9B in the oxygen/hydrogen generation process combines with oxygen produced at the cathode 9B in the hydrogen/oxygen generating process to form water. Heat of reaction is generated together with these water-forming reactions.

Figure 8:
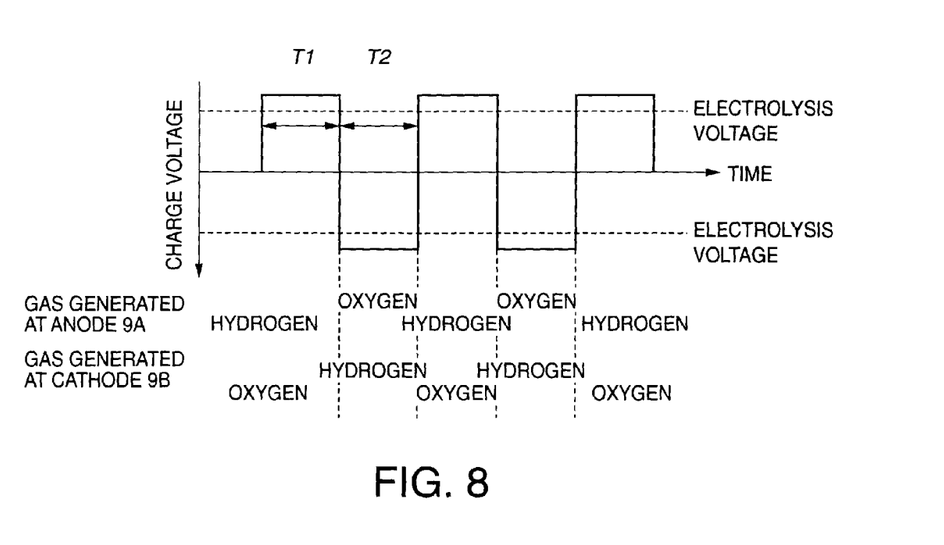
FIG. 8 is a timing chart describing a voltage application pattern in the thawing method according to the third embodiment of this invention.

The controller 16 changes over the switch 20 to alternate between the hydrogen/oxygen generating process and the oxygen/hydrogen generating process as shown in FIG. 8, and the thawing of ice in the MEA 8 is promoted using the reaction heat of water forming. In FIG. 8, the voltage application state wherein the anode 9A is at a higher potential than the cathode 9B is expressed as a positive voltage, and the voltage application state wherein the cathode 9B is at a higher potential than the anode 9A is expressed as a negative voltage.

The hydrogen/oxygen generating process continuation time T1 and oxygen/hydrogen generation process continuation time T2 are effectively identical, but considering that hydrogen is supplied to the anode 9A from the hydrogen cylinder 5, and oxygen is supplied to the cathode 9B as air from the compressor 3, T1 may be set less than T2.

As the thawing of the MEA 8 proceeds, hydrogen and oxygen supplied to the fuel cell 1 from outside reaches the catalyst more easily. In this regard, It is preferred to vary the ratio of T1 and T2 according to the progress of the thawing. Specifically, the time T1 of the hydrogen/oxygen process is shortened as thawing proceeds. This decreases the hydrogen production amount at the anode 9A and the oxygen production amount at the cathode 9B, and the decreases are compensated by hydrogen supplied from the hydrogen cylinder 5 and oxygen in the air supplied from the compressor 3. In this way, the thawing time is shortened.

Figure 9A:
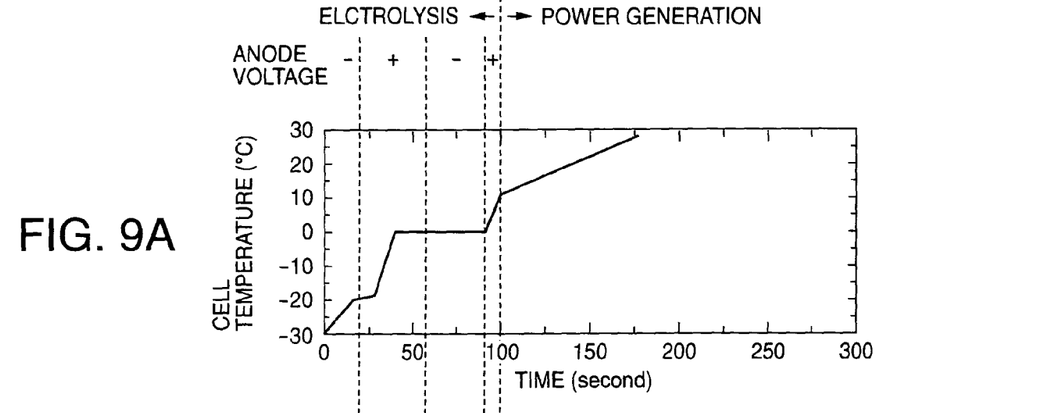
FIGS. 9A–9C are timing charts describing variations of fuel cell temperature, applied voltage and power consumption amount according to the thawing method of the third embodiment of this invention.
Figure 9B:
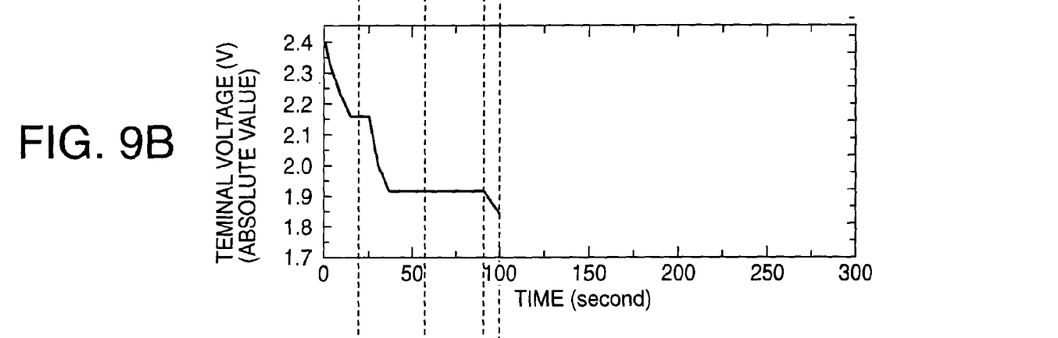
Figure 9C:
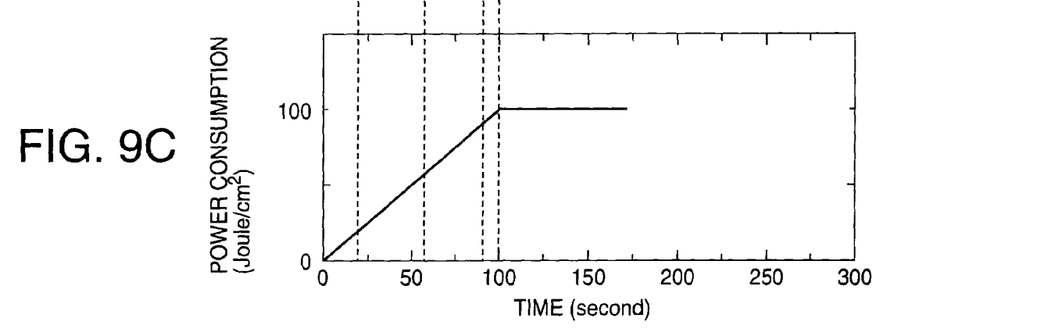

Referring to FIGS. 9A–9C, the results of the thawing experiment relating to this embodiment performed by the Inventor, will now be described.

At −30° C., as in the first and second embodiments, the hydrogen/oxygen process wherein the negative electrode of the secondary battery 13 was connected to the electrode 18A, and the positive electrode of the secondary battery 13 was connected to the electrode 18B via the constant current supply circuit 14, was performed for 20 seconds. Next, the oxygen/hydrogen generating process wherein the positive electrode of the secondary battery 13 was connected to the electrode 18A via the constant current supply circuit 14, and the negative electrode of the secondary battery 13 was connected to the electrode 18B, was performed for 40 seconds. Next, the hydrogen/oxygen process was performed for 30 seconds, and the oxygen/hydrogen generating process was performed for 40 seconds. During the experiment, hydrogen was supplied to the anode 9A from outside, and air was supplied to the cathode 9B from outside.

In the first embodiment, in the initial stage of the thawing, oxygen produced at the anode 9A and hydrogen supplied from outside, and hydrogen produced at the cathode 9B and oxygen supplied as air from outside, are respectively blocked by the ice in the three-phase boundary layer 22 so they cannot combine. On the other hand, in this embodiment, hydrogen produced at the anode 9A combines with oxygen produced at the anode 9A, and oxygen produced at the cathode 9B combines with hydrogen produced at the cathode 9B, even in the initial stage of the thawing. Therefore, the reaction heat due to combination can be fully used from the initial stage of thawing. Also, in the latter half of thawing, by respectively compensating the hydrogen production amount of the anode 9A and oxygen production amount at the cathode 9B with hydrogen and oxygen supplied from outside, the hydrogen/oxygen process can be shortened. Further, in this embodiment, the temperature variation trends of the fuel cell 1 identical to those of the first embodiment. However, whereas the time from beginning voltage application to completion of thawing is 250 seconds in the first embodiment, it is considerably shortened to 90 seconds in this embodiment.

The contents of Tokugan 2001-396579 and Tokugan 2001-396587 both of which were filed on Dec. 27, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

INDUSTRIAL FIELD OF APPLICATION

As described above, according to this invention, frozen water in the fuel cell is thawed using the electrolysis of water, and the fuel cell can be put into a power generating state with high efficiency and without the need for a special thawing device such as a heater or blower. Therefore, a particularly desirable effect is obtained when this invention is applied to a fuel cell power plant for vehicle mounting.

The embodiments of this invention in which an exclusive property or privilege is claimed are defined as follows:

1. A method of thawing frozen water in a fuel cell, applied to the start-up of a fuel cell power plant comprising a fuel cell stack comprising plural laminated fuel cells each of which has an anode and cathode on either side of an electrolyte membrane, and a secondary battery having a positive electrode and a negative electrode to supply a direct current voltage, the method comprising:

detecting a temperature of a fuel cell;
  thawing the frozen water when the temperature is less than a freezing point, by a heat generated by applying the direct current voltage between the anode and cathode to cause the frozen water to undergo electrolysis; and
  repeating an oxygen/hydrogen generation process wherein the anode is connected to the positive electrode and the cathode is connected to the negative electrode so as to cause the frozen water to undergo electrolysis to generate oxygen at the anode and generate hydrogen at the cathode, and a hydrogen/oxygen generating process wherein the anode is connected to the negative electrode and the cathode is connected to the positive electrode so as to cause the frozen water to undergo electrolysis to generate hydrogen at the anode and generate oxygen at the cathode.

2. The thawing method as defined in claim 1, wherein the method further comprises supplying hydrogen to the anode so as to form water by combining with oxygen generated at the anode by the electrolysis of the frozen water.

3. The thawing method as defined in claim 1, wherein the method further comprises supplying oxygen to the cathode so as to form water by combining with hydrogen generated at the cathode by the electrolysis of the frozen water.

4. The thawing method as defined in claim 1, wherein the voltage applied between the anode and cathode is set to a voltage corresponding to the sum of a voltage required to electrolyze water, and a voltage drop corresponding to an electrical resistance between the anode and cathode.

5. The thawing method as defined in claim 1, wherein the method further comprises supplying hydrogen to the anode while supplying oxygen to the cathode so as to cause a time length of the hydrogen/oxygen generating process to be shorter than a time length of the oxygen/hydrogen generating process.

6. The thawing method as defined in claim 1, wherein the method further comprises supplying hydrogen to the anode while supplying oxygen to the cathode and varying a time length of the hydrogen/oxygen generating process according to an elapsed time.

* * * * *